US010402309B2

(12) United States Patent
Drzewiecki et al.

(10) Patent No.: US 10,402,309 B2
(45) Date of Patent: Sep. 3, 2019

(54) CODE COVERAGE TRACKING FOR A MICROCONTROLLER PROGRAM

(71) Applicant: Microchip Technology Incorporated, Chandler, AZ (US)

(72) Inventors: Joseph Drzewiecki, Phoenix, AZ (US); James McInnes, Toronto (CA)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/916,509

(22) Filed: Mar. 9, 2018

(65) Prior Publication Data

US 2018/0322033 A1 Nov. 8, 2018

Related U.S. Application Data

(60) Provisional application No. 62/500,144, filed on May 2, 2017.

(51) Int. Cl.
*G06F 9/44* (2018.01)
*G06F 11/36* (2006.01)
*G06F 8/33* (2018.01)

(52) U.S. Cl.
CPC .......... *G06F 11/3676* (2013.01); *G06F 8/33* (2013.01); *G06F 11/3664* (2013.01); *G06F 11/3688* (2013.01)

(58) Field of Classification Search
CPC .... G06F 8/33; G06F 11/3664; G06F 11/3676; G06F 11/3688

(Continued)

(56) References Cited

U.S. PATENT DOCUMENTS 5,772,963 A * 6/1998 Cantatore .............. G01N 15/14
422/116
5,953,681 A * 9/1999 Cantatore .............. G01N 15/14
702/31

(Continued)

FOREIGN PATENT DOCUMENTS

EP 1589429 A2 10/2005 .............. G06F 11/36

OTHER PUBLICATIONS

Tikir et al., "Efficient Instrumentation for Code Coverage Testing", 2002, ACM, pp. 86-96 (Year: 2002).*

(Continued)

*Primary Examiner* — Ted T. Vo
(74) *Attorney, Agent, or Firm* — Slayden Grubert Beard PLLC

(57) ABSTRACT

A microcontroller may include a processor and at least one memory device storing (a) program code of a program defining a plurality of dominator arcs based on logical relationships among basic blocks (instructions) in the program code; and (b) a set of instrumentation points consisting of a subset of the program code basic blocks that correspond with the plurality of dominator arcs, each instrumentation point being located in a respective dominator arc. A code coverage implementation program (e.g., IDE or compiler) may be configured to instrument each instrumentation point in the program code with execution tracking instruction(s) to store or generate execution recording information. A testing tool may be used to execute the program on the microcontroller, wherein execution of each respective instrumentation point in the program code causes the respective execution tracking instruction to store or generate execution recording information indicating that the dominator arc corresponding with that instrumentation point has been executed by the testing tool.

16 Claims, 6 Drawing Sheets

(58) Field of Classification Search
USPC .................................................. 717/124–133
See application file for complete search history.

(56) References Cited

U.S. PATENT DOCUMENTS

| | | | |
|---|---|---|---|
| 7,093,234 B2* | 8/2006 | Hibbeler ............. | G06F 11/3423 717/124 |
| 8,484,623 B2* | 7/2013 | Li ....................... | G06F 11/3676 717/130 |
| 2009/0249309 A1 | 10/2009 | Li et al. ........................ | 717/132 |

OTHER PUBLICATIONS

Agrawal, "Dominators, Super Blocks, and Program Coverage Agrawal", 1994, ACM, 10 pages (Year: 1994).*

Agrawal, Hiralal, "Dominators, Super Blocks, and Program Coverage," Principles of Programming Languages, 10 pages, Jan. 1, 1994.

International Search Report and Written Opinion, Application No. PCT/US2018/029698, 13 pages, dated Jul. 13, 2018.

* cited by examiner

CODE COVERAGE TRACKING FOR A MICROCONTROLLER PROGRAM

RELATED PATENT APPLICATION

This application claims priority to commonly owned U.S. Provisional Patent Application No. 62/500,144 filed May 2, 2017, which is hereby incorporated by reference herein for all purposes.

TECHNICAL FIELD

The present disclosure relates to microcontrollers, and more particularly, to systems and methods for code coverage tracking of the execution of a microcontroller program, e.g., by a test suite.

BACKGROUND

Software programs that are designed for execution on a microcontroller are typically validated to ensure that the microcontroller functions correctly while executing the program. The validation can be conducted against a "test case," or a test "suite" of several test cases. A test case is a scripted, automated use of the program, typically in a test environment (as opposed to a production environment) that emulates the execution on the microcontroller, to validate the program's performance of a particular task. A test suite is a collection of test cases that together test all of the program's functions being validated.

A program developer may be asked or required to show that its product test suites "cover" (i.e., perform validation tests on) a certain percentage of the executable code in a project; this percentage is often 100%. Validating the executable code requires analyzing the behavior of the system via the system's assembly instructions. Embedded systems within microcontrollers can include thousands or even millions of assembly instructions.

An early historical method of determining code coverage was to track every instruction execution of a selection of code, and tabulate which instructions had been executed. This method typically requires simulators and hardware emulators with sufficient computing power and data storage to track every instruction execution, of which there may be millions.

A modern extension of this technique is available on (usually larger) microcontrollers equipped with an "instruction trace" mechanism. This mechanism typically requires expensive, high-speed hardware to capture the trace stream and exorbitant amounts of processing time by an external program (usually an IDE) to store, then retrieve and analyze what could easily be many gigabytes (or more) of trace data, which may be both expensive and time consuming. In addition, the correlation of instruction to "high-level language statement" is tenuous when the source code was written in a high-level language (like C) rather than assembly language. Although there is often a correlation of instructions to statements, it is not always easy to determine, and is rarely fixed from run-to-run. For example, if compiler optimization settings have changed, the flow of instructions may be dramatically different, so any correlation must be dynamic and cognizant of many changes in the executable image build and execution environment. This approach has the benefit of being accurate at a very fine granularity, but it is extremely inefficient for large bodies of code or long, involved test runs.

A subsequent approach was also derived from theory embodied in the development of high-level languages. This approach entails instrumenting branch points—known as "basic blocks"—with code that transmits a text message via a serial communication port. The idea of a "basic block" derives from a contiguous set of machine instructions with a single entry point. The boundaries of a basic block are easily determined by the compiler, but difficult to determine precisely from generated code. This led to the refinement of the process discussed above. By determining that a basic block has been executed, the system knows that every statement in the basic block has been executed. This leads to a reduction of the best case number of events to be tracked. Unfortunately, a non-trivial program typically contains a large number (e.g., hundreds) of basic blocks, which may require a substantial or unavailable amount of resources (e.g., memory) to tabulate their execution. Therefore, practical examples of this method have resorted to instrumenting source code with large and time consuming communications of an identification of the basic block being executed. On some microcontrollers, this can take the form of a call to a routine which outputs the basic block identification, along with a viable "envelope," over an available communications channel, often a UART. This approach has three significant drawbacks: 1) the instrumentation code can significantly impact the timing characteristics and performance of the code under test, 2) the instrumentation code is fairly large and may require only parts of the application to be instrumented in each test run, which has a multiplicative effect on the total time required to gather data on the code coverage, and 3) collecting data over partial runs introduces the unwanted effect of environmental and other test factors not being precisely the same from run to run.

Another known approach involves the use of simulators that are designed to track the execution of every instruction and are thus able to track which instructions are executed in situ. However, a programmer's customer might not accept simulated code coverage based on the view that a simulator is not sufficiently representative of the actual device.

SUMMARY

The present disclosure provides system and method for in-situ code coverage, i.e., code coverage performed on a manufactured microcontroller, while the microcontroller is executing the subject code. The disclosed systems and methods may be applicable, for example, in the domain of embedded microcontroller product development.

According to various embodiments, the present disclosure provides systems and methods for performing code coverage and code coverage tracking for program code of programs and device logic executing on an embedded microcontroller. In particular, the code coverage and code coverage tracking is performed on the microcontroller itself while the program code is executing. Using technology from the field of code compilation to instrument the program code, the disclosed methods may produce a much smaller set (in number) of instrumentation points than existing techniques. These instrumentation points are the only points required to exhaustively differentiate between program code that was executed and program code that was not executed.

In some embodiments, a dominator tree and profile arcs are used to produce the instrumentation points. For typical programs, instrumenting profile arcs may increase the efficiency of the representation over basic blocks by a factor of about two or three as compared with certain conventional techniques.

In some embodiments, the program code may be instrumented with a single bit-set instruction to toggle a "dirty bit" in a RAM array for each respective dominator arc of the program code, e.g., at each defined instrumentation point in the program. Instrumenting the program code with a single bit-set instruction to toggle a dirty bit in a RAM array allows reduced or minimal time and space disruption in the program, and allows for post-processing of the dirty-bit array by an integrated development environment (IDE). The dirty-bit array may have a fixed size (i.e., fixed over time), so unlimited-length runs of a test suite against the program code may be used to validate the operation of the program, as well as the efficacy of the test suite.

In other embodiments, the program code may be instrumented with a subroutine call in each respective dominator arc of the program code, e.g., at each defined instrumentation point in the program, that calls a subroutine that sets or generates dominator arc execution recording information that indicates that the respective dominator arc has been executed. For example, in one embodiment, each dominator arc may be instrumented with a "NOP phase change" trap and a corresponding trap handler including instructions that effect a "phase change" on a respective no-op (NOP) instruction in the program, e.g., by changing a "1 type" NOP instruction to a "0 type" NOP instruction, which allows a post-processing tracking application to review the NOP instruction to determine whether the respective dominator arc was executed. This embodiment may be performed fully within the ROM (e.g., flash memory) of the microcontroller, and thus avoid using valuable RAM memory space.

BRIEF DESCRIPTION OF THE FIGURES

Example embodiments are discussed below with reference to the drawings, in which.

DETAILED DESCRIPTION

Embodiments of the invention provide systems and methods for determining code coverage for embedded microcontroller systems in an in-situ environment. In at least some embodiments, such in-situ systems and methods do not require a serial, network, or other connection of the microcontroller to a peripheral device in order to determine the code coverage. Some embodiments may provide significant improvements in execution speed, storage requirements, and computing resource consumption as compared to existing systems and methods.

Figure 1:
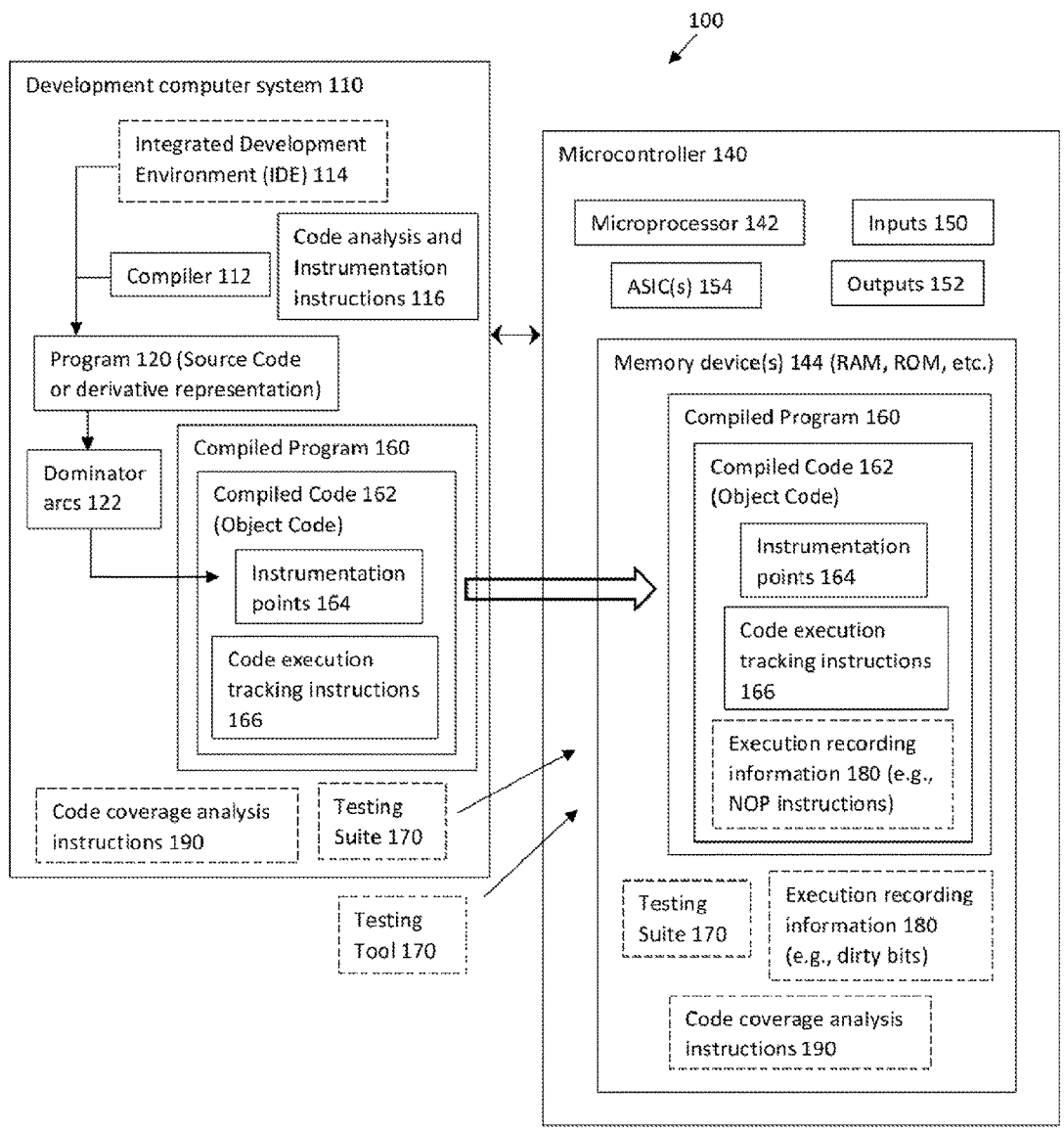
FIG. 1 is a diagram of an example system for in-situ testing and code coverage analysis of a program installed on a microcontroller, in accordance with embodiments of the present invention.

FIG. 1 shows an example system 100 for in-situ testing and code coverage analysis of a program (e.g., software application) installed on a microcontroller, according to embodiments of the present invention. System 100 may include a development computer system 110 and a microcontroller 140.

Development computer system 110 may include any suitable system for developing and compiling a program (e.g., software application) to be stored on microcontroller 140. In some embodiments, development computer system 110 may be configured to analyze the program code to identify a plurality of "dominator arcs" in the code, and instrument each dominator arc with code execution tracking configured to record the execution of each respective dominator arc during execution of the program, e.g., by a testing suite, to thereby determine the code coverage provided by the testing suite.

As shown, development computer system 110 may include a compiler 112, which may be included in an (optional) integrated development environment 114, or provided as a stand-alone compiler, for example. In addition to typical code compiling functions, compiler 112 (and/or IDE 114) may be configured to execute code analysis and instrumentation instructions 116 integrated in or otherwise accessible to compiler 112 (and/or IDE 114) at any point during the compilation of a program 120, which may be embodied as source code or any derivative representation (e.g., intermediate representation (IR) such as high level IR or low level IR, for example). In other embodiments, code analysis and instrumentation instructions 116 may be provided separate from compiler 112, e.g., in a plug-in or other program provided in or accessible to system 110. Code analysis and instrumentation instructions 116 may be configured to analyze the program code of a program 120 to identify a plurality of "dominator arcs" 122 in the code (using techniques discussed below) and instrument each dominator arc 122 with code execution tracking instructions 166 at a defined instrumentation point 164 in each respective each dominator arc 122. The compiled and instrumented program, instrumented with code execution tracking instructions 166, is indicated as compiled program 160, which may then be stored in memory 144 of microcontroller 140, as shown in FIG. 1.

The code execution tracking instructions 166 instrumented at each instrumentation point 164 may be configured to record the execution of the respective instrumentation point 164 by storing or generating execution recording information 180 (discussed below) during execution of the compiled program 160 on microcontroller 140, e.g. by a testing suite 170 provided on or external to the microcontroller 140. The execution recording information 180 for each respective instrumentation point 164 indicates that the corresponding dominator arc 122 was executed. The execution recording information 180 for the plurality of instrumentation points 164 (corresponding with the plurality of dominator arcs) can then analyzed to determine the program code coverage of the program 160 provided by the testing suite 170.

Although this document refers to "code execution tracking instructions" (plural) instrumented at each instrumentation point, some embodiments may provide the code execution tracking using only a single instruction instrumented at each instrumentation point, and thus "code execution tracking instructions" is intended to include one or multiple instructions.

Thus, microcontroller 140 may be configured to provide in-situ code coverage tracking of program 160, e.g., via a testing suite 170. Microcontroller 140 may include any suitable components for performing any of the functionality disclosed herein and/or any other microcontroller functions. For example, as shown in FIG. 1, microcontroller 140 may include a processor (e.g., microprocessor) 142 that executes installed programs, processes input data, and transmits output data, and one or more memory devices 144, which may include one or more persistent and/or non-volatile memory device, e.g., read-only memory (ROM) devices, and/or one or more volatile memory, e.g., random access memory (RAM) devices.

Memory device(s) 144 may store any or all of the following instructions and/or data: assembly instructions configured for execution by processor 142; at least one program 160 (e.g., a user-installed program) including program code 162; and a test suite 170 of tests to be performed on the program code 162 of each respective user-installed program 160 (in some embodiments, test suits 170 may alternatively be provided external to microcontroller 140). As discussed above, program code 162 may be instrumented with execution tracking instructions 166 at a plurality of instrumentation points 164 in a plurality of corresponding dominator arcs defined by the program code 162.

As discussed above, during execution of program 160 (e.g., by testing suite 170), the execution tracking instructions 166 by store or generate execution recording information 180 upon the execution of each instrumentation point 164 in the program 160, which indicates that a respective dominator arc 122 was executed. In some embodiments, the execution recording information 180 is stored within the program code 162, e.g., in the form of modified code instructions. For example, as discussed below, execution tracking instructions 166 may include instructions that modify a no-op (NOP) instruction in the program code 162, which indicates that a respective instrumentation point 164 has been executed. In other embodiments, the execution recording information 180 is separate from the program code 162 (and/or in a separate memory from the program code), e.g., in the form of "dirty bits," as discussed below.

Testing suit 170 may be an internally or externally imposed set of test conditions, e.g., supplied by a customer, for testing the execution of a program 160. It may compare a set of conditions that a customer prepares in code written by the customer, or a set of external stimuli applied by a test rig of the customer's design, or a test rig supplied by a higher-level supplier (e.g., as may be common in the automotive industry, for example). Thus, in some embodiments, test suit 170 may be entirely external to microcontroller 140. As an illustrative example, a test suite 170 for an automobile test mule having a microcontroller-based fly-by-wire throttle could be embodied as a robotically controlled accelerator pedal that performs a pre-programmed sequence of pedal depressions along with other control inputs.

Code coverage analysis instructions 190 may be provided by development computer system 110, or by microcontroller 140, or by a separate testing suite 170, and configured to analyze execution recording information 180 stored or generated during execution of the program 160 to generate and/or output information indicating the execution of program 160 being tested by test suite 170, e.g., including a percentage of the program code 162 executed by the test suite 170.

As discussed above, a set of instrumentation points 164 may be defined for program 160, e.g., by code analysis and instrumentation instructions 116 (incorporated in compiler 112 or otherwise provided). A set of instrumentation points 164 may comprise a subset of basic blocks for the respective program 160, wherein execution of the instrumentation points 164 for the program 160 ensures execution of all dominator arcs 122 in the program 160, and thus ensures execution of all code 162 of the program 160, e.g., by a test suite 170. As discussed above, code analysis and instrumentation instructions 116 may instrument code execution tracking instructions 166 at each instrumentation point 164, such that the code execution tracking instructions 166 form a part of the instrumentation points 164 for the program 160, e.g., in the form of dirty bit setting instructions or instructions for changing the state of defined NOP instructions.

In some embodiments, execution recording information 180 may be embodied by dirty bits. Dirty bits may comprise arrays of bits that can be set to indicate whether each respective instrumentation point 164 of the program 160 has been executed by test suite 170. Thus, each instrumentation point 164 may have a corresponding dirty bit, indicating whether that instrumentation point 164 has been executed. In some embodiments, code execution tracking instructions 166 may set a respective dirty bit upon detection that the respective instrumentation point has been executed. In some embodiments, code execution tracking instructions 166 form part of the complied program code, and are thus stored in a first memory (e.g., ROM), and executable to access the dirty bits stored in a second memory (e.g., RAM) and set each respective dirty bit upon execution of a respective instrumentation point.

In other embodiments, execution recording information 180 may be embodied by the status of a no-op (NOP) instruction corresponding with each instrumentation point 164. A subroutine call may be instrumented at each instrumentation point 164, which calls a subroutine that sets or generates execution recording information 180 that indicates that the respective dominator arc has been executed. For example, in one embodiment, each dominator arc may be instrumented with a "NOP phase change" trap and a corresponding trap handler configured to modify a NOP instruction, e.g., by changing from a "1 type" NOP instruction to a "0 type" NOP instruction, or vice versa. Thus, the status of each NOP instruction indicates whether the corresponding instrumentation point 164, and thus the corresponding dominator arc of the program code 162, has been executed.

Microcontroller 140 may also include one or more input ports 150 for connecting to and receiving data from other devices; one or more output ports 152 for connecting to and transmitting data to other devices; one or more application-specific integrated circuits (ASICs) 154, which may be used to implement internal peripherals and services; and various data busses communicatively connecting the components of the microcontroller 140 to each other.

In some embodiments, microcontroller 140 may be configured to perform the disclosed code coverage tracking in-situ. For example, processor 142 may be placed in a testing mode, e.g., by a customer, in which the processor 142 may execute the test suite 170 on one or more installed programs 160. During execution of each program 160, code execution tracking instructions 166 instrumented in the respective program code 162 may store/generate execution recording information 180 indicating the execution of corresponding dominator arcs, as discussed above. While in the testing mode, the microcontroller processor 142 or testing suite 170 may execute code coverage analysis instructions 190 to retrieve and analyze execution recording information 180 and report code coverage information indicating the code coverage of the respective program 160, in the form of a code coverage percentage or other metric.

In some embodiments, code analysis and instrumentation instructions 116 may identify dominator arcs 122 and/or instrumentation points 164 using a mechanism derived from graph theory: the concept of "dominance" of nodes in a directed graph. For example, in a graph G=(N, E), where N are the nodes of the graph and E are the edges connecting the nodes, the dominance set is a subset D of set N such that every node not in D is adjacent to at least one member of D. The domination number y(G) is the number of nodes in the smallest dominating set for G. The present disclosure shows that understanding dominance has the effect that a set of basic blocks of a program code can be guaranteed to execute given that any instruction in the dominance set executes. Specifically, each basic block of program code in a program can be represented as a node of a directed graph. An invocation by a first basic block of a second basic block is represented as an edge directed from the first basic block's node to the second basic block's node. This directed graph can be made into a spanning tree by determining a subset of the directed graph that includes all of the nodes and has the minimum possible number of edges.

The dominance of each of the nodes may be determined from the spanning tree, and then a dominator tree may be produced to reflect the dominance of each node in the tree. Practically, this leads to a reduction of the number of nodes that must be instrumented to determine which code has been executed. That is, if an instruction or statement that is part of a basic block is executed, it can be assumed that all of the code of that basic block code is executed; similarly, if a particular basic block is executed, it can be assumed that all of the code of all of the basic blocks that are dominated by the executed basic block is also executed. The illustrated example described below shows an example process of computing the dominator tree, the post-dominator tree, and a super-block dominator graph. Only the leaf nodes, i.e., the nodes that do not point to any nodes further down the graph, which each corresponding to one dominance arc, are instrumented to produce a set of instrumentation points for the corresponding program. As only the leaf nodes are instrumented, the set has fewer instrumentation points as compared with existing techniques.

In fact, in some embodiments that utilize dirty bits as the execution recording information 180, the number of instrumentation points 164 for a program 160 may be so far reduced that the instrumentation points 164 can be tracked in available RAM space allocated to the program 160. The bit array 180 for a program 160 may include a single bit for each instrumentation point 164 in the program 160 (i.e., each basic block corresponding to a leaf node of the dominator graph), i.e., one bit per dominator arc. In some embodiments, the required data storage resources needed to track the code coverage is set at the time the program code is compiled, and remains unchanged.

Further, in embodiments that utilize NOP instruction status as the execution recording information 180, the execution tracking may be performed fully within the ROM (e.g., flash memory) of microcontroller 140, and thereby avoid using valuable RAM memory space in the microcontroller.

Figures 2A, 2B:
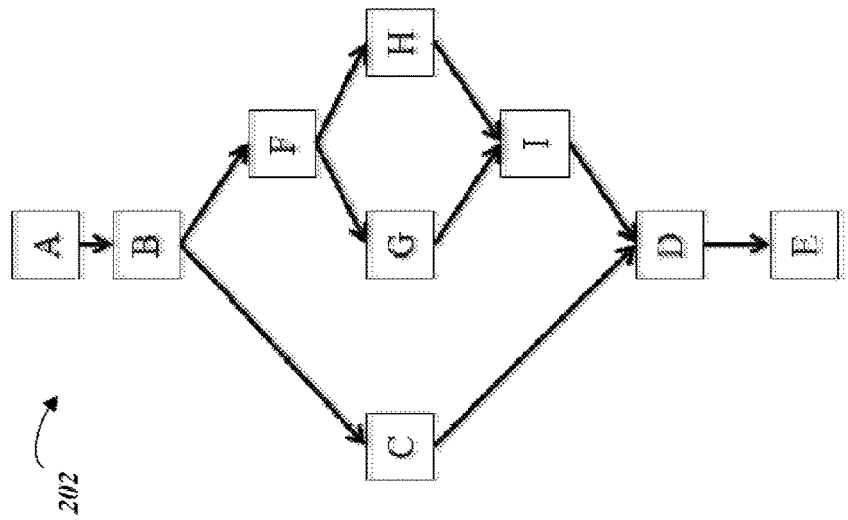
FIG. 2A is a diagram of an example program analyzed by the present systems and methods, according to embodiments of the present invention.
FIG. 2B is a diagram of the example program of FIG. 2A arranged by basic blocks of program code into a directed graph.

FIG. 2A illustrates an example program 200 (having a simple control structure) to demonstrate the disclosed code coverage tracking techniques, according to an example embodiment. The example program 200 contains fourteen statements (in the C language) of program code, which would compile to an arbitrary and variable number of assembly language instructions, depending on the relevant instruction set architecture, the efficiency of the target compiler and the degree of optimization desired, among other secondary effects. The example program 200 can be apportioned into nine basic blocks A-I based on the paths into and out of each block of code.

FIG. 2B illustrates the example program 200 represented as a directed graph 202 where the basic blocks A-I are the nodes. The relationships among the basic blocks resolves into the dominator table of Table 1, which shows the set of basic blocks that each basic block dominates; for a particular basic block, the set of basic blocks it dominates includes each basic block that must be executed if the particular basic block is executed.

TABLE 1

| Basic Block | Dominates {set} |
| --- | --- |
| A | {A} |
| B | {A, B} |
| C | {A, B, C} |
| D | {A, B, D} |
| E | {A, B, D, E} |
| F | {A, B, F} |
| G | {A, B, F, G} |
| H | {A, B, F, H} |
| I | {A, B, F, I} |

Figure 2C:
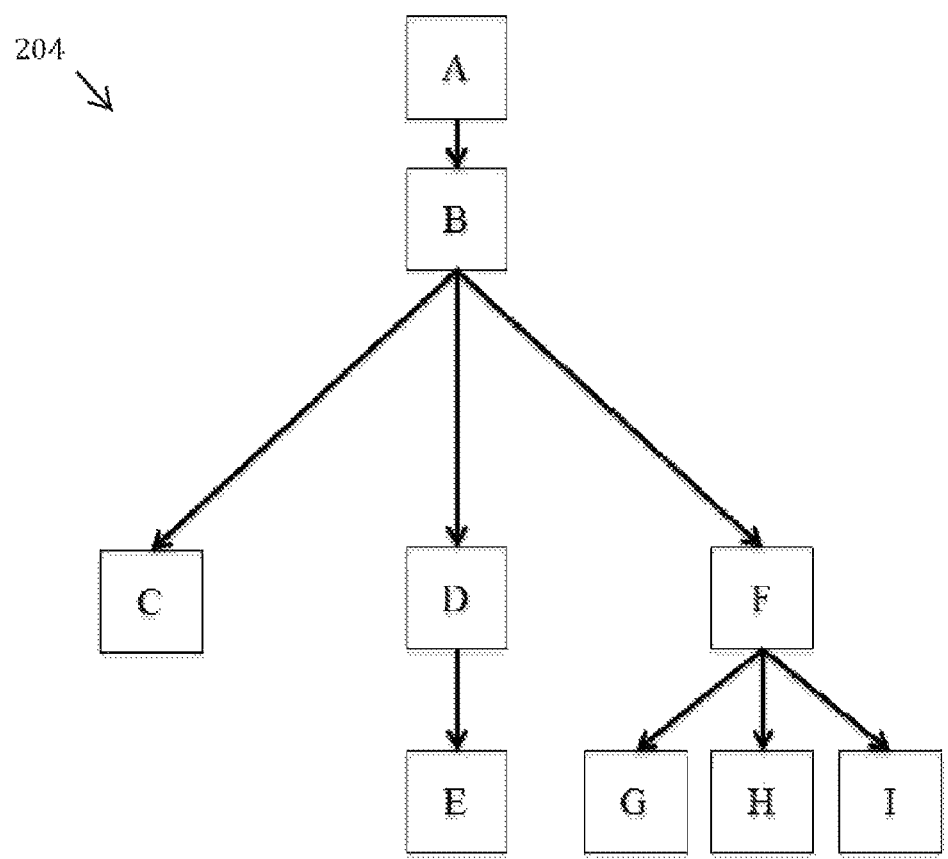
FIG. 2C is a diagram of the example program of FIG. 2A arranged by basic blocks of program code into a dominator graph.

The dominator table may also be represented as a directed graph. FIG. 2C illustrates a directed graph of a dominator tree 204 corresponding with the example Table 1 shown above, according to an example embodiment. As shown, the dominator tree 204 shows that the example program 200 defines five dominator arcs, whose leaf nodes correspond to five of the basic blocks C, E, G, H, and I. Instrumenting those five basic blocks C, E, G, H, I will provide complete code coverage tracking of the corresponding program 200. In this manner, processor 142 may generate the set of instrumentation points C, E, G, H, and I, which set provides complete code coverage tracking of the program 200.

Figure 3:
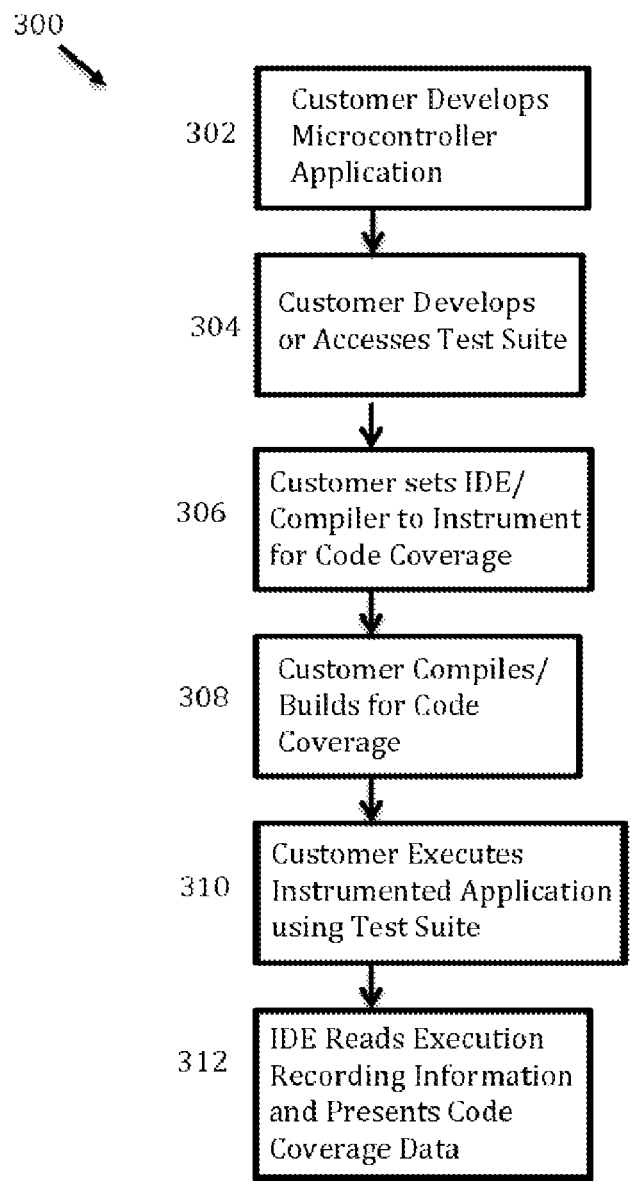
FIG. 3 illustrates an example method for code coverage tracking of the execution of a program by a test suite, according to an example embodiment.

FIG. 3 illustrates an example method 300 for code coverage tracking of the execution of a program 160 by a test suite 170, according to an example embodiment. At 302, a user (e.g., a customer) may develop a program (e.g., software application) 160 for execution on a microcontroller 140, e.g., using an integrated development environment (IDE) 114 at a development computer system 110. At 304, the user may develop a test suite 170 or access an existing test suite 170. The user may wish to know the extent to which the test suite 170 covers the program code 162 of the program 160 developed at 302, e.g., whether the test suite 170 covers 100% of the code 162 or some lesser portion of the code 162. Thus, at 306, the user may set the IDE 114 or a stand-alone compiler 112 to instrument for code coverage tracking.

At 308, the user may compile or build the program 160 to instrument for code coverage tracking, e.g., according to techniques disclosed herein. For example, This may compiler 112 may automatically identify dominator arcs 112 in the program code 162 and instrument code execution tracking instructions 166 at an identified instrumentation point 164 in each identified dominator arc 122. The code execution tracking instructions 166 may be configured to generate or store execution recording information 180 (e.g., by storing dirty bits or changing the status of specified NOP instructions) upon the execution of each respective instrumentation point 164, such that the execution recording information 180 for respective instrumentation point 164 indicates execution of a corresponding dominator arc of code 162. The user may then install the compiled program 162, instrumented for code coverage tracking, in memory 144 of microcontroller 140.

At 310, the user may use the test suite 170 to run the instrumented program 160 installed on microcontroller 140, wherein the instrumented code execution tracking instructions 166 store or generate execution recording information 180 (e.g., by storing dirty bits or changing the status of specified NOP instructions) upon the execution of each respective instrumentation point 164. At 312, the IDE may read the execution recording information 180 set or stored at 310, and present to the user an indication of the program code coverage by the test suite 170.

Figures 4A, 4B:
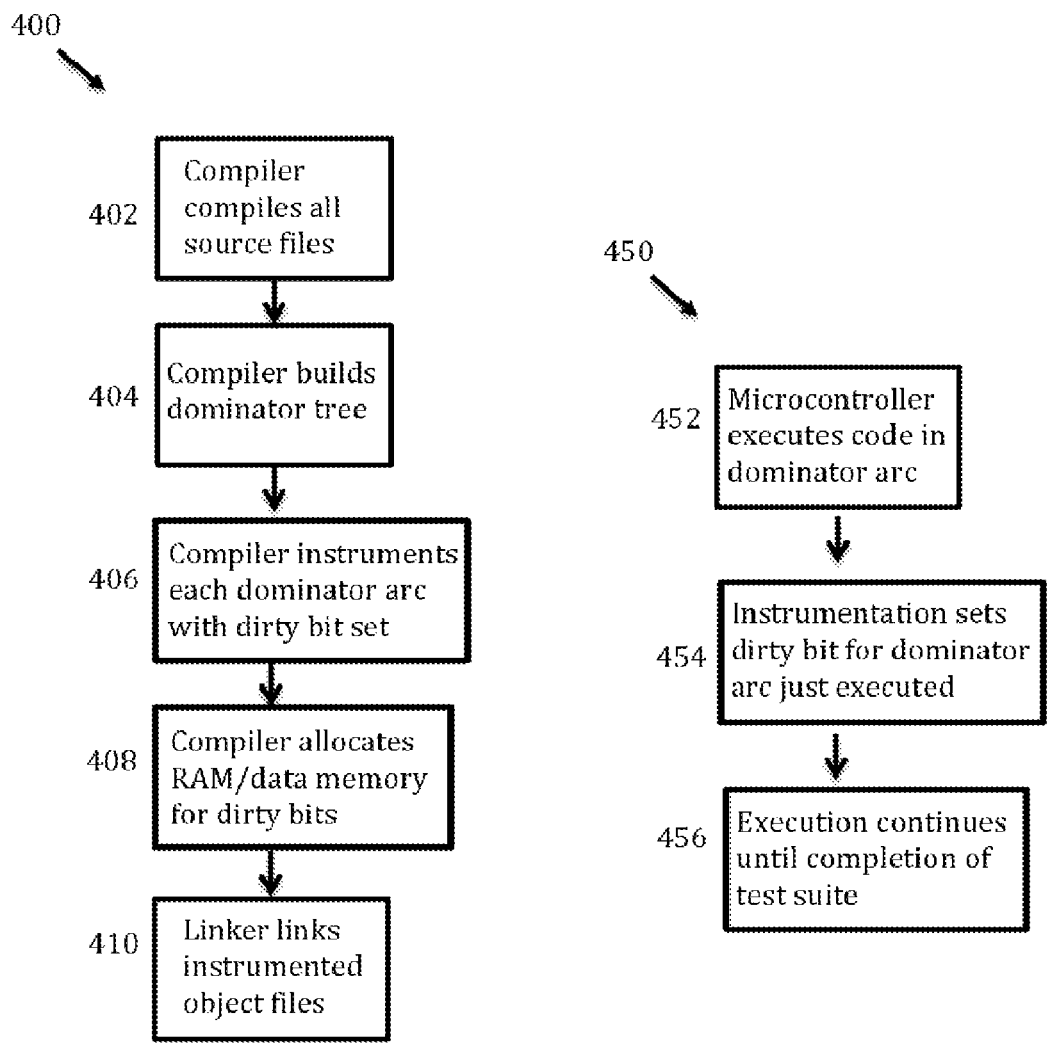
FIGS. 4A and 4B illustrates example methods for compiling a program for code coverage tracking and runtime execution of the compiled program, respectively, according to an example embodiment that utilizes dirty bits as execution recording information.

FIGS. 4A and 4B illustrates example methods 400 and 450 for compiling and instrumenting a program 120 for code coverage tracking, and runtime execution of the compiled program 160, respectively, according to an example embodiment that utilizes dirty bits as execution recording information 180.

First, FIG. 4A illustrates an example method 400 for compiling a program 120 for code coverage tracking using dirty bits, according to one example embodiment. At 402, a compiler 112 may compile all source files of a program (e.g., software application) 120. At 404, compiler 112 builds a dominator tree of basic blocks in program 120 to define a set of dominator arcs 122 and thereby identify a set of instrumentation points 164, each corresponding to a respective dominator arc 122, e.g., using techniques discussed herein, e.g., as discussed above with reference to FIGS. 2A-2C. At 406, compiler 112 may instrument each dominator arc 112 with a dirty bit set. At 408, compiler 112 may allocate data memory in microcontroller 140, e.g., in microcontroller RAM, for the instrumented dirty bits. Finally, at 410, a linker may link the instrumented object files of the compiled program 160.

FIG. 4B illustrates an example method 450 for runtime execution of test suite 170 executing compiled program 160 instrumented for code coverage tracking using dirty bits via method 400, according to one example embodiment. At 452, test suite 170 executes program 160 on microcontroller 140, wherein one, some, or all instrumentation points 164 (each corresponding with a respective dominator arc 122) are executed by test suite 170. At 454, as each instrumentation point 164 is executed, the code execution tracking instructions 166 set a corresponding dirty bit (e.g., in microcontroller RAM), indicating that the corresponding dominator arc 122 has been executed. At 456, test suite 170 continues to execute program 160 until completion of the test suite. As discussed above regarding step 312 of method 300, an IDE 114 may then execute code coverage analysis instructions 190 to read the dirty bits stored in RAM (execution recording information 180), and present to the user an indication of the test suite coverage of program code 162 based on the dirty bit data.

Figures 5A, 5B:
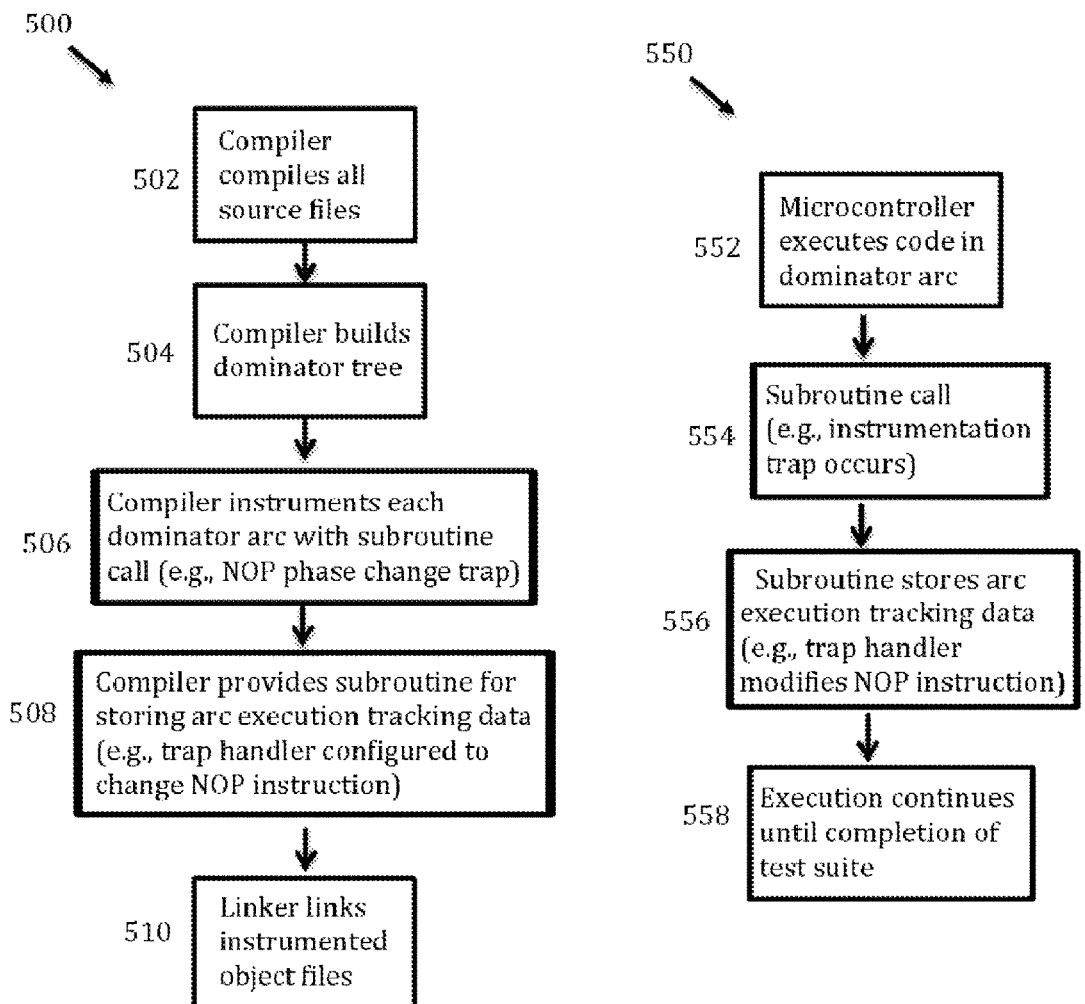
FIGS. 5A and 5B illustrates example methods for compiling a program for code coverage and runtime execution of the compiled program, respectively, according to an example embodiment that utilizes no-op (NOP) instruction status as execution recording information.

FIGS. 5A and 5B illustrates example methods 400 and 450 for compiling a program 120 for code coverage tracking, and runtime execution of the compiled program 160, respectively, according to an example embodiment that utilizes no-op (NOP) instruction status as the execution recording information 180.

First, FIG. 5A illustrates an example method 500 for compiling a program 120 for code coverage tracking based on manipulation of NOP instructions, according to one example embodiment. At 502 a compiler 112 may compile all source files of a program (e.g., software application) 120. At 504, compiler 112 builds a dominator tree of basic blocks in program 120 to define a set of dominator arcs 122 and thereby identify a set of instrumentation points 164, each corresponding to a respective dominator arc 122, e.g., using the techniques discussed herein, e.g., as discussed above regarding FIGS. 2A-2C.

Compiler 112 may then instrument each dominator arc 122 with code execution tracking instructions at 506-508. In particular, at 506-508, compiler 112 may instrument each dominator arc 122 with a subroutine call that calls a subroutine that sets or generates execution recording information 180 indicating that the respective dominator arc 122 has been executed. For example, in one embodiment, each dominator arc may be instrumented with a "NOP phase change" trap at the respective instrumentation point 164, which jumps to a respective trap handler instructed to modify an NOP instruction, e.g., by changing a NOP instruction from one variant to another, e.g., from a "1 type" NOP instruction to a "0 type" NOP instruction (which typically requires substantially less energy than changing from "0 type" to "1 type" due to semiconductor physics), or vice versa. The execution recording information 180 set or generated by the subroutine instrumented at each respective instrumentation point 164 (e.g., a respective NOP instruction being changed from a "1 type" a "0 type") indicates that the respective instrumentation point 164, and thus the corresponding dominator arc 122 in the program code 162, has been executed. Finally, at 510, a linker may link the instrumented object files of the compiled program 160.

FIG. 5B illustrates an example method 550 for runtime execution of test suite 170 executing compiled program 160 instrumented for code coverage tracking (e.g., using NOP instruction status) via method 500, according to one example embodiment. At 552, test suite 170 executes program 160 on microcontroller 140, wherein one, some, or all instrumentation points 164 (each corresponding with a respective dominator arc 122) are executed by test suite 170. At 554, as each instrumentation point 164 is executed, the respective subroutine call instrumented at step 506 calls and executes the subroutine at 556 to set or generate execution recording information 180 that indicates that the respective dominator arc 122 has been executed. For example, in an embodiment in which each instrumentation point 164 is instrumented with a "NOP phase change" trap, as a respective instrumentation point 164 is executed at 554, the respective "NOP phase change" trap occurs, and at 556 the trap handler modifies a respective NOP instruction, e.g., by changing an NOP instruction from a "1 type" to a "0 type," or vice verse, as discussed above, indicating that the corresponding dominator arc 122 has been executed. At 558, the test suite 170 continues to execute program 160 until completion of the test suite. As discussed above regarding step 312 of method 300, an IDE 114 may then execute code coverage analysis instructions 190 to read the execution recording information 180 (e.g., the status of the NOP instructions), and based on such execution recording information 180, determine and present to the user an indication of the test suite coverage of program code 162.

The present invention has been described in terms of one or more preferred embodiments, and it should be appreciated that many equivalents, alternatives, variations, and modifications, aside from those expressly stated (e.g., methods of manufacturing, product by process, and so forth), are possible and within the scope of the invention.

What is claimed is:

1. A system for code coverage tracking, the system comprising:
a code coverage instrumentation program for instrumenting a program for code coverage tracking, wherein the program includes program code defining a plurality of basic blocks and a plurality of dominator arcs based on logical relationships among the plurality of basic blocks, and wherein code coverage instrumentation program is executable to:
specify a set of instrumentation points consisting of a subset of the plurality of basic blocks of the program code wherein each instrumentation point is located in a respective one of the plurality of dominator arcs; and
instrument each instrumentation point in the program code with a respective code execution tracking instruction to store or generate execution recording information; and
a microcontroller comprising:
a processor; and
at least one memory device storing:
the program code of the program:
the set of instrumentation points in the program code specified by the code coverage instrumentation program; and
the code execution tracking instruction instrumented at each instrumentation point by the code coverage instrumentation program
wherein the microcontroller processor is configured to use a testing tool to execute the program on the microcontroller, wherein execution of each respective instrumentation point in the program code by the microcontroller processor causes the respective execution tracking instruction to store or generate execution recording information to thereby perform code coverage tracking of the execution of the program code in-situ on the microcontroller, without a serial, network, or other connection of the microcontroller to a peripheral device to determine the code coverage,
wherein the execution recording information stored or generated for each instrumentation point indicates that the dominator arc corresponding with the respective instrumentation point has been executed by the testing tool.

2. The system of claim 1, wherein storing or generating execution recording information for a respective instrumentation point comprises storing a single bit indicating that the respective instrumentation point has been executed.

3. The system of claim 1, wherein the code coverage tracking further includes:
identifying a set of instrumentation points consisting of selected basic blocks in the plurality of dominator arcs, wherein the set of instrumentation points provides complete code coverage tracking of the program;
determining that a respective instrumentation point has been executed via the testing tool, and in response, storing in a memory device of the microcontroller a bit array indicating that the respective instrumentation point has been executed, the bit array including a single bit for each of the instrumentation points.

4. The system of claim 1, wherein:
a respective dominator arc includes multiple basic blocks of the plurality of basic blocks; and
storing or generating execution recording information for a respective instrumentation point comprises storing or generating data indicating that each of the multiple basic blocks of the respective dominator arc has been executed.

5. The system of claim 1, comprising identifying the plurality of dominator arcs in the program by a process including:
generating information representing a directed graph of the plurality of basic blocks;
generating a dominator tree based on the information representing the directed graph of the plurality of basic blocks; and
using the dominator tree to identify the plurality of dominator arcs.

6. The system of claim 1, wherein the code coverage tracking includes:
determining that all instrumentation points in all dominator arcs have been executed via the testing tool; and
storing in memory data indicating that all instrumentation points have been executed, which indicates complete code coverage of the program by the testing tool.

7. The system of claim 1, wherein the testing tool is provided on the microcontroller.

8. The system of claim 1, wherein the code coverage instrumentation program is stored in a memory device of a development computer system separate from the microcontroller.

9. The system of claim 1, wherein instrumenting each instrumentation point in the program code with respective execution tracking instructions comprises instrumenting each instrumentation point with dirty bit instructions configured to set a dirty bit in memory upon execution of the respective instrumentation point.

10. A microcontroller, comprising:
a processor; and
at least one memory device storing:
a program including program code defining a plurality of basic blocks and a plurality of dominator arcs based on logical relationships among the plurality of basic blocks;
wherein the program code is instrumented with execution tracking instructions at each of a plurality of instrumentation points in the program code, wherein each instrumentation point is located in a corresponding one of the plurality of dominator arcs in the program code;
wherein the processor is configured to execute the program on the microcontroller using a testing tool, wherein execution of each respective instrumentation point in the program code causes the respective execution tracking instruction to store or generate execution recording information in the at least one memory device indicating that the respective instrumentation point has been executed, to thereby perform code coverage tracking of the execution of the program code in-situ on the microcontroller, without a serial, network, or other connection of the microcontroller to a peripheral device to determine the code coverage,
wherein the execution recording information stored or generated for each respective instrumentation point indicates that the dominator arc corresponding with the respective instrumentation point has been executed by the testing tool.

11. A method for code coverage tracking of an execution of program code of a program stored in non-transitory memory, the method comprising:

identifying a plurality of basic blocks of the program code;

generating a dominator tree defining a plurality of dominator arcs based on logical relationships among the plurality of basic blocks;

identifying a set of instrumentation points in the program code consisting of a subset of the plurality of basic blocks of the program code, the set of instrumentation points corresponding with the plurality of dominator arcs wherein each instrumentation point is located in a corresponding one of the plurality of dominator arcs; and instrumenting each instrumentation point in the program code with respective execution tracking instructions to modify a respective no-op (NOP) instruction in the program code upon execution of the respective instrumentation point, wherein modification of each NOP instruction upon execution of the respective instrumentation point indicates that the dominator arc corresponding with the respective instrumentation point has been executed.

12. The method of claim 11, further comprising:

using a testing tool to execute the program, wherein execution of each respective instrumentation point in the program code causes the respective execution tracking instruction to store or generate execution recording information, wherein the execution recording information stored or generated for each instrumentation point indicates that the dominator arc corresponding with the respective instrumentation point has been executed by the testing tool; and accessing the stored execution recording information to determine a code coverage of the program by the testing tool.

13. The method of claim 12, wherein the code coverage of the program is determined by execution of the program using the testing tool and accessing the execution recording information stored or generated upon execution of the respective instrumentation points without a serial, network, or other connection of the microcontroller to a peripheral device to determine the code coverage.

14. The method of claim 11, wherein:

a respective dominator arc includes multiple basic blocks of the plurality of basic blocks; and storing or generating execution recording information for a respective instrumentation point comprises storing or generating data indicating that all basic blocks in the respective dominator arc have been executed.

15. The method of claim 11, wherein:

the program is stored in a first memory device of the microcontroller; and the execution tracking instructions are configured to store or generate the execution recording information in a second memory device of the microcontroller.

16. The method of claim 11, wherein:

the program is stored in a memory device of the microcontroller; and the execution tracking instructions are configured to store or generate the execution recording information in the same memory device of the microcontroller.

* * * * *